W. A. PATTERSON.
COTTON THRESHING MACHINE.
APPLICATION FILED DEC. 18, 1916.
1,248,000.
Patented Nov. 27, 1917.
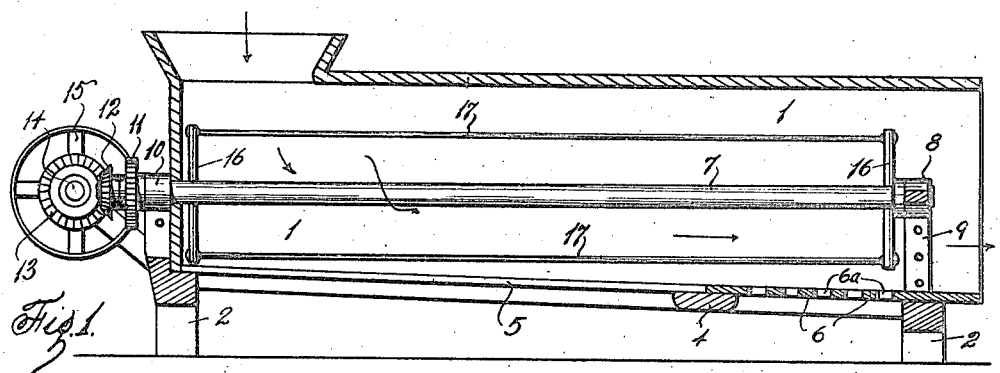
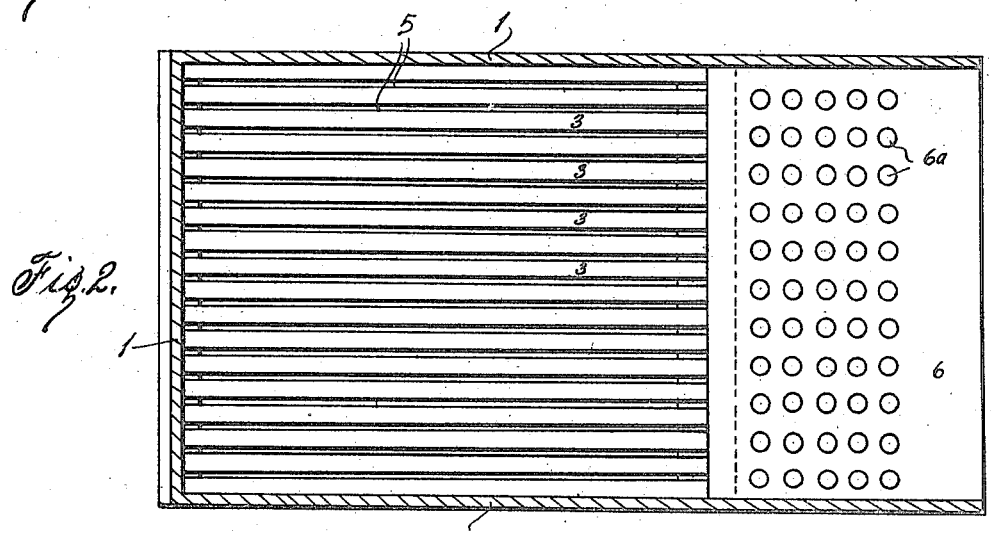
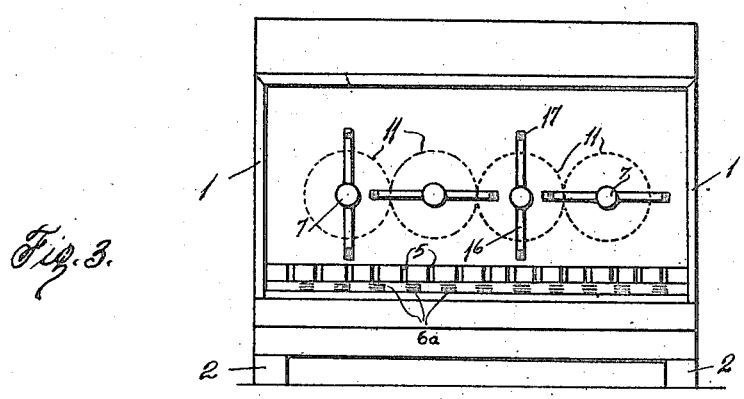
INVENTOR
Warren A Patterson
BY
J. C. Ledbetter
ATTORNEY

UNITED STATES PATENT OFFICE.

WARREN A. PATTERSON, OF WICHITA FALLS, TEXAS, ASSIGNOR OF ONE-HALF TO JOSEPH A. KEMP, OF WICHITA FALLS, TEXAS.

COTTON-THRESHING MACHINE.

1,248,000.   Specification of Letters Patent.   Patented Nov. 27, 1917.

Application filed December 18, 1916. Serial No. 137,510.

*To all whom it may concern:*

Be it known that I, WARREN A. PATTERSON, a citizen of the United States of America, residing at Wichita Falls, in the county of Wichita and State of Texas, have invented certain new and useful Improvements in Cotton-Threshing Machines, of which the following is a specification.

This invention relates to threshing machines and is particularly conceived and designed for use in threshing the cotton crop by extracting and separating the cotton locks from the bolls and stalks.

In the use of the machine comprising this invention the cotton will be allowed to open to its maximum maturity and then cut bodily by any approved form of cutting machine and thereafter ranged in piles or winrows accessible to the harvesting machine. The cotton will then be conveyed to the threshing machine, or the machine transported to the cotton in the field. This machine will be built according to a design most convenient in size adaptable for its working capacity and preferably provided with transport wheels which will allow it to be transported from one portion of the field to another to best reach the cotton to be threshed.

The particular purpose of the invention is to provide a battery of revolving beaters or stirrers working at a normally high rate of speed within a partially closed housing, which housing will be provided with certain openings adapted to dispose of each separate product as it is separated.

The description within these Letters Patent of the machine comprising this invention and herein disclosed in the drawings illustrating same is specifically descriptive of the particular form and design of machine illustrated for a comprehensive understanding of the machine and its industrial uses, but the broadness of the machine and its extended adaptability and use in handling the particular agricultural products is set out in the appended claims of these Letters Patent, which claims are intended and drawn to include in their extent of protection that basic principal which is disclosed in this invention, and said claims are drawn and conceived to include all such modifications and changes in design and form of machines for this purpose as may come within the scope and purview of said claims.

With the above and other objects in view the invention has relation to a certain combination and arrangement of parts, an example of which is described in the following specification pointed out in the appended claims and illustrated in the accompanying drawings; wherein, Figure 1 illustrates a longitudinal vertical sectional view of the cotton harvester.

Fig. 2 illustrates a sectional plan view of the harvester, omitting the operating elements of said machine.

Fig. 3 illustrates in rear end elevation the machine.

Referring now more in particular to the several views of the drawing, wherein the same parts are designated by identical reference characters, the numeral 1 designates the vertical side-walls and closed front end of the casing of the machine. The casing and frame of the machine is assembled and supported upon a substantially heavy frame support 2. In cases desired by the users of the machine to convey the same to the field it may either be loaded on a wagon or provided with transport wheels in some approved form mounted upon the frame 2 of the machine.

The conception of this invention has an especial arrangement in its floor design. A plurality of longitudinally arranged strips or floor boards 3 are supported at each end by the frame and cross beam 4 of said frame. The floor members are arranged as illustrated to leave a substantially narrow slot or opening therebetween as shown by the numeral 5. This peculiar form of floor construction provides the floor of the casing, for a considerable distance from the front toward the rear, with a great number or narrow long slotted openings. A perforated floor base 6 abuts the floor strips, joining same, and arranged flush therewith is supported upon the cross beam 4 and the frame of the machine extended rearwardly as illustrated. This portion of the floor last described is provided with a plurality of circular openings or holes $6^a$, many in number and closely formed one to the other, providing a floor with a great number of openings, which holes or openings will be of a sufficient size to only admit the passage of the ordinary size cotton lock or fiber product which is extracted and drawn from the bolls. The combination of the perforated and the parallel slotted floor comprises the floor portion of the casing. The floor of the casing as just described is adapted to be higher at the front end of the machine than at the rear, and as illustrated declines gradually from front to rear.

A plurality of revolving beaters are arranged longitudinally within the machine and parallel one with another. Said beaters are similar in design and construction and comprise a substantially long and heavy shaft 7 journaled at its rear extremity in the bearing block 8, which journal is a substantially long and heavy journal support adapted to be fixed to the side-walls of the frame, as shown at 9, and extend horizontally across the machine adapted to receive the shaft ends of each beater. The forward extremity of the shafts 7 extend through the front closed end of the machine and are received by the journal 10. Gears 11 are fixed to each shaft and adapted to mesh one with the other through the train of revolving beaters comprising the battery of said beaters or stirrers, as shown in dotted lines in Fig. 3. This form of gear assembly comprising a train consisting of a plurality of meshing gears fixed to each adjacent beater shaft causes each adjacent beater to revolve in a direction opposite to its companion or adjacent beater shaft, which gives a battery of oppositely revolving beaters. A beveled pinion 12 is fixed to the extended extremity of any one shaft which may be selected to drive the battery and meshes with a driving gear 13 fixed to a shaft 14 which is driven from a power wheel 15 adapted to transmit motion to the driven pinion from any source of motive power which may be applied. A pair of strong arms 16 are fixed to each shaft 7 near its extremity thereof. A wire or rod 17 of small diameter is provided in a taut tension between the extremities of the arms 16. This form of construction gives an assembled beater as illustrated in side elevation in Fig. 1, every other beater of the battery contained within the casing being similarly arranged in position as shown in the end elevation 3, which Fig. 3 shows some of the beaters with arms vertically parallel arranged while the other arms of the beaters are horizontally arranged. This arrangement of each beater of the battery provides a system of beaters all driven from a common gear and adapted to revolve in timed unison in very close proximity one with the other without interference one with the other.

In the operation of the machine the battery of revolving stirrers or beaters will be run at a considerably high rate of speed and the cotton stalks introduced into the machine through the upper hopper opening provided and into the rapidly running battery of beaters. The tremendous agitation and stirring capacity of the oppositely running beaters of the battery sets up a veritable centrifugal whirling motion irresistible to the cotton locks within the stalks and causes the stalks and locks to be separated one from another. Such agitation as described breaks the smaller limbs and tender substances, such as bark, leaves and twigs from the cotton stalks, which smaller portions and leaves as mentioned are broken and shaken through the slotted openings 5 of the floor. Said openings 5 being too narrow to admit the passage of the cotton locks allows only the trashy portion of the cotton stalk to pass therethrough while the larger stalks and bolls of fibrous product gradually work toward the rear of the machine and toward the perforated floor 6, where the cotton locks are caused to pass through the perforations of the floor. The stalks pass on out the rear open end of the machine. By the time the heavy body portion of the cotton stalks have traveled the length of the machine from the front to the rear and precipitated from the open rear end they are broken and twisted into stalks of short broken lengths. This is caused by the tremendous agitation and breaking power of the high speed revolving beaters. The oppositely revolving beaters of the battery and the rod or wire 17 grasps in the limbs of the cotton stalk and whirls it around till the centrifugal motion and adjacent agitation of the next beater has jerked and shaken all the cotton locks from the stalk. The burs or hulls which contain the cotton lock and fiber are broken up and passed through the slots with the finer by-product and trash. The general direction of the passage of the stalks of cotton from front to rear is indicated in Fig. 1 by the arrows.

The capacity of this machine to thresh and separate cotton in the field is unlimited since the machine can be varied in size merely by designing same with a greater or lesser number of revolving beaters, which gives the beater battery a varying capacity to handle the cotton introduced through the hopper. The speed of the machine may also be varied to increase the capacity or out-put of harvested cotton, but it will be preferably run at a substantially high rate of speed during its operation.

The invention is presented with the following claims:

1. In a cotton threshing machine, the combination with a housing provided with a receiving hopper and a discharge opening, the floor surface of said housing being provided with a plurality of elongated slotted openings of a size sufficient to permit cotton stalks and limbs to pass through and further provided with a plurality of perforations of a size sufficient to permit cotton locks to pass through, and agitating means provided for subjecting unpicked cotton placed in the housing to a violent agitation.

2. In a cotton threshing machine, the combination with a housing provided with an opening for receiving unpicked cotton and a limb and stem discharge opening, a floor formed in the housing with a plurality of slotted openings extending from the cotton receiving opening back a distance from the end of the casing and the remaining portion of the floor provided with a plurality of perforations, and means provided within the housing for subjecting the unpicked cotton to violent wiping actions across the many openings.

3. In a cotton thresher, the combination with a housing provided with a sloping floor and unpicked cotton receiver and limb and stalk discharge opening, means for allowing extracted cotton locks to pass out the machine through the floor, means for allowing the twigs and leaves to pass out through the floor, and a plurality of oppositely revolving stirrers arranged in a parallel relation and closer to the floor of the housing at one end of the machine than at the other end of the machine.

4. In a cotton threshing machine, the combination with a closed housing fitted with a receiving hopper and discharge opening, a floor in the housing a portion of the area of which is provided with a plurality of slotted openings and the remaining area of which is provided with a plurality of perforations, and a battery of oppositely revolving beaters comprising parallel arranged shafts with radiating arms carrying taut wires for the purpose of violently stirring and wiping the unpicked cotton across and through the many openings in the floor.

In testimony whereof I hereunto set my hand this the 9th day of Dec., A. D. 1916, in the presence of witnesses.

WARREN A. PATTERSON.

Witnesses:
L. T. GRANBERRY,
J. C. MYTINGER.

Copies of this patent may be obtained for five cents each, by addressing the "Commissioner of Patents, Washington, D. C."